Jan. 13, 1953     C. M. BENBOW     2,625,000
ATTACHMENT FOR SIDE DELIVERY HAY RAKES
Filed Jan. 2, 1952
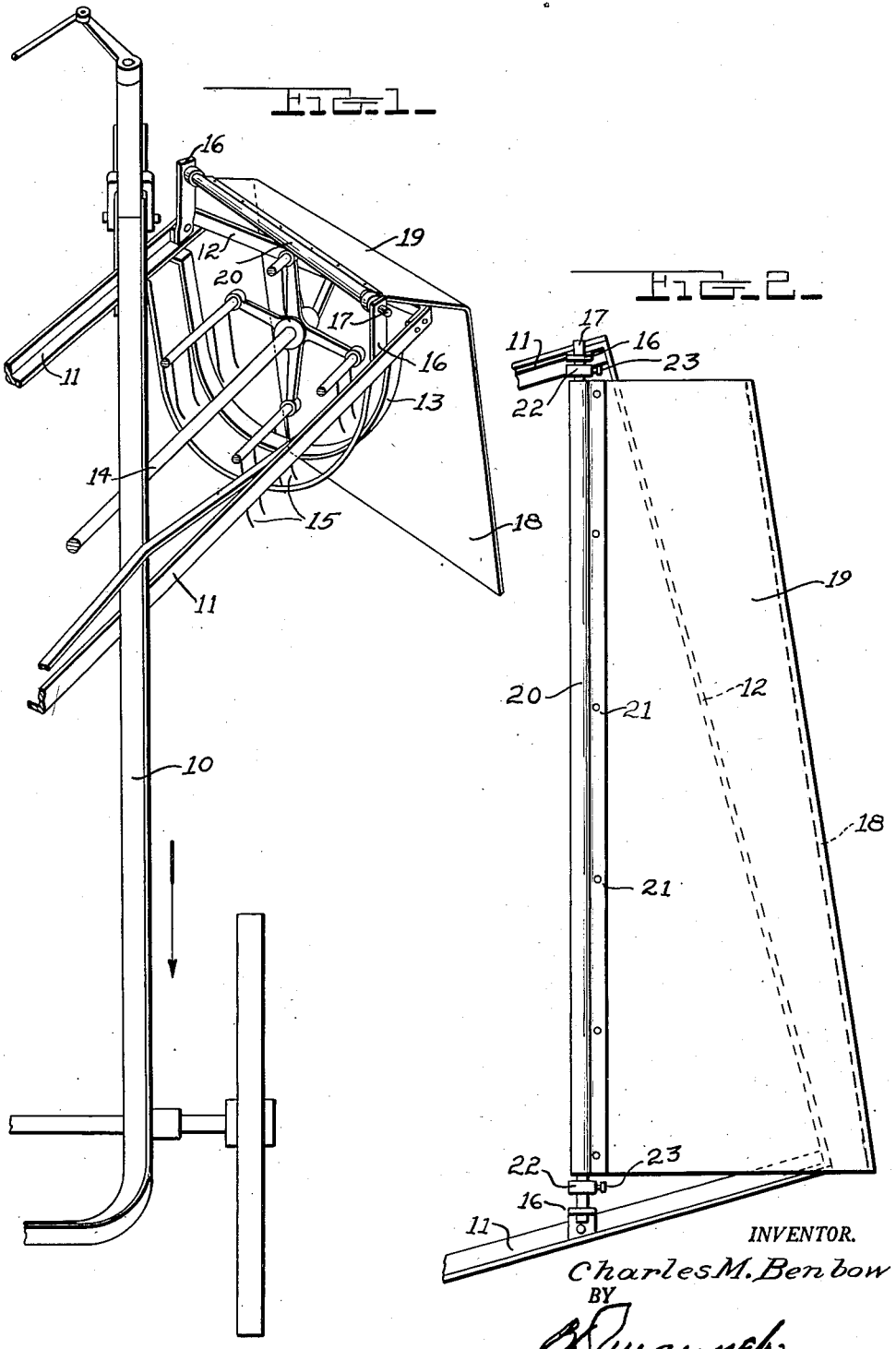
INVENTOR.
Charles M. Benbow
BY
atty.

Patented Jan. 13, 1953

2,625,000

UNITED STATES PATENT OFFICE 2,625,000

ATTACHMENT FOR SIDE DELIVERY
HAY RAKES

Charles M. Benbow, Anderson, Ind.

Application January 2, 1952, Serial No. 264,554

1 Claim. (Cl. 56—399)

This invention relates to agricultural machinery and has special reference to a side delivery rake.

More particularly, the invention relates to a guard attachment for side delivery rakes.

In the type of side delivery rakes hereinafter referred to, the usual construction of rake consists in general of a trailer carriage such as may be drawn through a field by a tractor or other means. This trailer carriage is arranged to extend across the path of travel of the device. From one side of the trailer carriage and angling backwardly therefrom is a rake frame, the end nearest the trailer carriage being suitably connected thereto while the other end is provided with means for supporting this other end from the ground. In this frame is rotatably mounted a reel having several bars extending from one end to the other and these bars carry the rake teeth. One of the wheels of the trailer carriage is operatively connected to the reel by suitable means so that, as the device moves over the field of mown hay, the reel is rotated to pick up and turn this mown hay. At the same time, due to the angular disposition of the reel, the material being treated is moved along the rake and is delivered from the end remote from the trailer carriage to form a windrow. In the usual construction it frequently happens that the part of the hay or other material which has lain in contact with the ground and is therefore damp, is turned entirely over so that it again contacts with the ground. Thus the drying of the hay is retarded.

It is the principal object of the present invention to provide means whereby, during the formation of the windrow, the hay or other material is checked in its overturning movement so that the part previously resting on the ground will now be turned upward for exposure to the sun and air.

Another important object of the invention is to provide a device for this purpose which is of simple construction and which may be applied to any existing form of side delivery rake.

A further object of the invention is to provide a means for the purpose described which consists of but few parts and those of a nature not liable to become damaged or require repairs.

With the above and other objects in view, as will be hereinafter apparent, the invention consists in general of certain novel details of construction and combinations of parts, hereinafter fully described, illustrated in the accompanying drawing and particularly claimed.

In the accompanying drawing like characters of reference indicate like parts in the several views, and in which:

Fig. 1 is a perspective view showing a portion of a trailer carriage and the delivery end of a side delivery rake connected thereto, and Fig. 2 is a plan view to an enlarged scale and showing the extreme delivery end of the rake and the improved invention attached thereto.

As here illustrated, a portion of a trailer carriage is indicated at 10. Diagonally to the rear of this carriage extends a rake frame having longitudinal bars 11 and an end bar 12. At the delivery ends this rake frame is elevated above the ground by a hoop or runner 13. The frame supports a reel indicated in general at 14 having rake teeth 15. This reel is rotated by operative connection to one of the wheels of the carriage 10, such means being well known and not being deemed necessary to be illustrated herein.

Extending upwardly from the frame members 11 is a pair of supports 16, which have their upper ends connected by a shaft 17. It will be observed that the shaft 17 is angularly disposed with respect to the frame end 12.

The attachment further consists of an apron preferably formed of plate material and having a vertical portion 18 and an upper portion 19 extending at an obtuse angle from the upper edge of the portion 18. This portion 19 is provided with a tubular attachment 20 secured in place by rivets such as 21 and this tubular attachment is mounted on the shaft 17 so that a swinging movement of this apron on the shaft is permitted. In order to hold the apron centrally of the shaft, collars 22 are fitted on the shaft at each end of the member 20 and are there secured by set screws 23. It is to be noted that the lower edge of the vertical portion 18 is arranged to lie slightly spaced from the ground and that this vertical portion 18 has its rear end closer to the rake frame than its front end as shown in Fig. 2.

The operation of this attachment, as the hay or other material is delivered from the rake, strikes against the vertical portion 18 of the apron and is checked in its rolling movement so that the major part of the hay only turns over one-half a revolution, thus bringing the damper part uppermost for drying exposure.

While there is herein shown and described the preferred embodiment of the invention, it is nevertheless to be understood that minor changes may be made therein without departing from the spirit and scope of the invention as claimed.

What is claimed is:

For a side delivery rake having a frame supported in vertically spaced relation to the ground over which the rake travels and wherein said frame has side bars extending longitudinally of the rake, an apron supported on the delivery end of the rake and having a substantially vertical wall extending across said end and terminating at its lower edge in proximity to the ground, the forward position of said lower edge being spaced from the rake at less distance than the rear portion of said edge, an angular extension at the upper edge of the vertical wall of the apron overlying the adjacent end of the rake frame, and means to swingingly support said apron from said frame, said means comprising a pair of eyed supports extending upwardly from said side bars, a shaft carried in the eyes of said supports, a sleeve formed on the free edge of the apron extension and having the shaft extending therethrough and end collars adjustably mounted on the shaft at opposite ends of said sleeve for centering the apron on said shaft.

CHAS. M. BENBOW.

REFERENCES CITED

The following references are of record in the file of this patent:

UNITED STATES PATENTS

| Number | Name | Date |
|---|---|---|
| 754,990 | Geery | Mar. 22, 1904 |
| 2,398,389 | Oehler | Apr. 16, 1946 |
| 2,573,971 | Hoefer | Nov. 6, 1951 |